United States Patent [19]
Thayer et al.

[11] Patent Number: 5,099,192
[45] Date of Patent: Mar. 24, 1992

[54] LIGHT EMITTING DIODE ARRAY CURRENT POWER SUPPLY

[75] Inventors: Billy E. Thayer; Charles A. Brown; Donald M. Reid, all of Corvallis, Oreg.; Steven Kalata, Sunnyvale, Calif.

[73] Assignee: Hewlett-Packard Company, Palo Alto, Calif.

[21] Appl. No.: 597,259

[22] Filed: Oct. 12, 1990

[51] Int. Cl.$^5$ .............................................. G05F 3/26
[52] U.S. Cl. .................................... 323/315; 323/316; 323/317; 307/296.1; 307/296.6; 346/107 R; 346/108; 354/5; 354/7
[58] Field of Search ................... 323/311–316, 323/317; 307/296.1, 296.6, 296.8, 31–33, 38; 346/107 R, 108, 139 R, 154; 354/5, 7

[56] References Cited

U.S. PATENT DOCUMENTS 4,780,731  10/1988  Creutzmann et al. ............... 346/108
4,864,216   9/1989  Kalata et al. ...................... 323/315

Primary Examiner—Steven L. Stephan
Assistant Examiner—Emanuel Tood Voeltz

[57] ABSTRACT

A power supply circuit for an LED print head has a reference current source connected to a printer system reference voltage for providing a second reference voltage for an individual, integrated circuit chip. The reference current source is controlled by an operational amplifier, the output of which comprises the second reference voltage. A plurality of output driver FETs are biased by the reference voltage. Each output driver FET provides current to an associated LED responsive to a data signal. A plurality of control FETs are connected in parallel with each other and in series with each output driver FET for varying the LED output current responsive to programming data signals. A second group of control FETs is interposed in the feedback loop of the operational amplifier for varying the second reference voltage responsive to a different set of programming data signals.

17 Claims, 1 Drawing Sheet

LIGHT EMITTING DIODE ARRAY CURRENT POWER SUPPLY

BACKGROUND OF THE INVENTION

1. Field of the Invention

The present invention relates generally to light emitting diode array current power supplies and more particularly to such supplies which use an operational amplifier to regulate a constant current source.

2. Description of the Related Art

It has become desirable to employ non-impact xerographic-type printers for text and graphics. In such a printer, an electrostatic charge is formed on a photoreceptive surface of a moving drum or belt and selected areas of the surface are discharged by exposure to light. A printing toner is applied to the drum and adheres to the areas having an electrostatic charge and does not adhere to the discharged areas. The toner is then transferred to a sheet of plain paper and is heat-fused to the paper. By controlling the areas illuminated and the areas not illuminated, characters, lines and other images may be produced on the paper.

One type of non-impact printer employs an array of light emitting diodes (commonly referred to herein as LEDs) for exposing the photoreceptor surface. A row, or two closely spaced rows, of minute LEDs are positioned near an elongated lens so that their images are arrayed across the surface to be illuminated. As the surface moves past the line of LEDs, they are selectively activated to either emit light or not, thereby exposing or not exposing, the photoreceptive surface in a pattern corresponding to the LEDs activated.

To form good images in an LED printer, it is desirable that all of the light emitting diodes produce the same light output at the image plane when activated. This assures a uniform quality image all the way across a paper. The light output at the image plane depends on a number of factors including current, temperature, lens transmittance factors and processing parameters for forming the LED which may affect its light output as a function of current.

Light emitting diodes for print heads are formed on wafers of gallium arsenide or the like, suitably doped to conduct current and emit light. Long arrays of LEDs are formed on a wafer which is cut into separated dice, each having an array of LEDs. A row of such dice are assembled end-to-end to form a print head array. The light output of the LEDs on a given die are usually reasonably uniform, however, there may be variations from die to die as processing parameters differ between dice. There is some variation within dice from an individual wafer and greater variation from wafer to wafer.

The LEDs are driven by power supplies on integrated circuit chips. The current output of these chips may also vary depending on processing parameters in making these chips. Such variations may compound the variations in light output.

A parameter that is partly LED power supply dependent is the rise time for current flow. This is significant, since the exposure of the photoreceptive surface is a function of both intensity and illumination time. In an LED print head, there may be a few thousand LEDs across the width of the photoreceptive surface. The current in each LED may also be affected by the number of LEDs enabled at any time. Thus, there may be a relatively high current and concomitant higher light intensity or total exposure when a few LEDs are enabled, as compared with the current and light output when a very large number of LEDs are enabled.

Prior U.S. Pat. No. 4,864,216 to Kalata et al., which is incorporated herein by reference, provides a power supply for an LED print head in which a chip reference voltage biases a plurality of output driver FETs to provide substantially the same preselected current level to an LED associated with each output driver FET. The current is switched by a data signal applied to a data FET in series with each driver FET and LED. The Kalata et al. power supply represents a significant advance in the art in that it assures uniform light output across the array and a light output substantially independent of differences in the number of LEDs enabled.

It can be seen that in an ideal system, the current signal applied to each diode is a square wave of equal duration and magnitude. Such a signal generates uniform exposure of the charged surface, assuming equal light output for each LED at the image plane. The Kalata et al. power supply, while producing light substantially uniformly, tends to generate a current square wave with overshoot on the leading edge. This is a result of capacitive coupling between the gate and drain of the output driver FETs. When the data FET in a selected leg of the power supply switches on, the voltage on the drain of the output driver drops and tends to drag down the chip reference voltage applied to the gate of the output driver FET. This tends to turn on the FET harder thus providing more current until the capacitive coupling discharges. When such discharge occurs, the chip reference voltage returns to the selected level thereby dropping the current level through the output driver FET to the desired level.

As noted above, variations from one LED to another can cause variations in light output given the same current through each LED. Similarly, variations from chip to chip can cause differences in the average total chip light output given the same reference voltage on each chip. The Kalata et al. power supply suggests a variable resistor to change the chip reference voltage.

It would thus be desirable to compensate for variations from chip to chip and from LED to LED within a single chip. It would be advantageous to achieve such compensation with data programming signals.

It would also be desirable to provide a current through each LED which is substantially a square wave, i.e., without any, or at least without any consequential, overshoot or undershoot.

It would also be desirable to provide a light emitting diode array current power supply which can be powered by a lower current supply voltage than such prior art power supplies.

BRIEF SUMMARY OF THE INVENTION

In one aspect, the present invention comprises a reference FET and a plurality of output driver FETs, each of which has an output connection for an LED. The gates of all of the FETs are connected to a low impedance voltage source. A constant current is passed through the reference FET. Current flows from a selected output driver into its associated LED responsive to a data signal.

In another aspect of the invention, means are provided for varying the chip reference voltage responsive to programming data signals.

In still another aspect, the invention includes a plurality of control FETs in parallel with one another and in series with the output connection. The current applied to each LED is a function of the chip reference voltage and the bias condition of the control FETs.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

An exemplary LED print head has a row of 228 LED dice placed end-to-end to stretch across the width of a photoreceptive surface. Each die has 64 LEDs along its length. The LED dice are made in large numbers on a gallium arsenide wafer, which is then cut up to form the individual dice. It is found that there are variations in LED light output as a function of current from wafer to wafer, due to differences in processing variables. Generally speaking, all of the LEDs on a die are quite similar to each other in this characteristic. Dice from different wafers may differ appreciably in light output as a function of current. Dice from various portions of a wafer may fall somewhere in between. The light output from the LEDs on a large number of LED dice tends to have a more or less Gaussian distribution around a desired light output.

To minimize this source of non-uniformity in LEDs used in practice of this invention, the light output for each LED die is measured and the dice are sorted into collections or "bins" so that all of the dice in a given bin have a variation in light output much smaller than the variation occurring in the total population of LED dice. When a given print head is assembled, all of the dice are taken from a single bin so that the intrinsic light output as a function of current is substantially the same for all of the LEDs on that print head. What is next needed is a power supply which delivers a substantially square wave current pulse to each LED in the array and which further includes means for varying the current from chip to chip as well as from LED to LED on a selected chip responsive to programming data signals.

Power is supplied to the LEDs from integrated circuit chips mounted in close proximity to the LED dice. In an exemplary embodiment, an integrated circuit chip is located next to an LED die and contains circuits for delivering current to the LEDs on the LED die. Such a chip may include a variety of other print head operational circuits which do not form a part of this invention. For example, data signal multiplexing circuits may be included on the chip.

Figure 1:
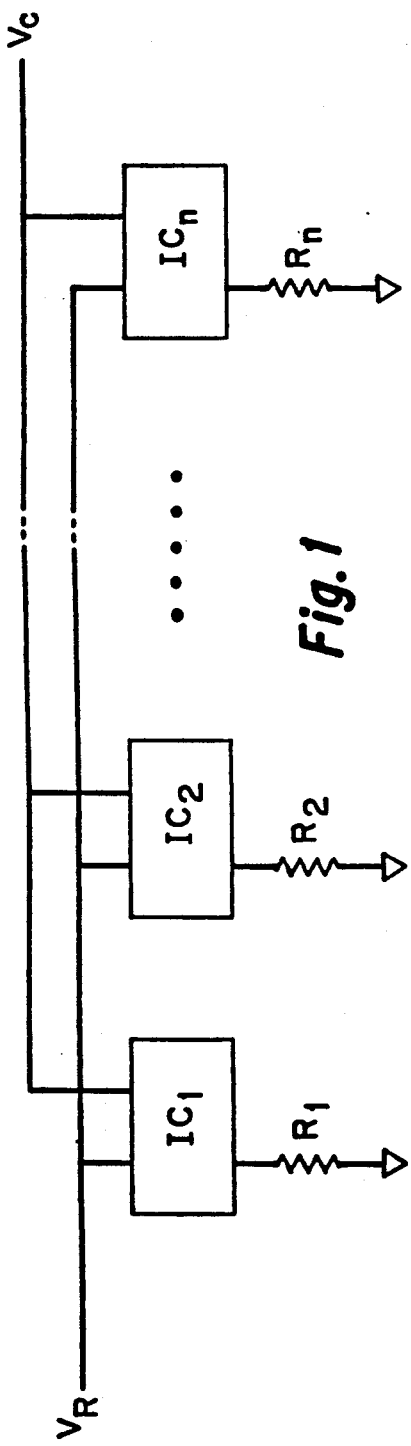
FIG. 1 illustrates in block form a plurality of integrated circuit chips for an exemplary power supply.

Thus, as indicated schematically in FIG. 1, there may be a row of integrated circuit chips $IC_1, IC_2 \ldots IC_n$ mounted near a row of LED dice (not shown). A power supply voltage $V_C$, is applied to each of the integrated circuit chips. A system reference voltage, $V_R$ is also applied to each chip. The magnitude of the system reference voltage can be set so that the light output from a given LED print head achieves a desired average level. For example, if the intrinsic light output from the set of LEDs on the print head is lower than the mean of the Gaussian distribution of light outputs, the reference voltage for that print head might be a higher value than for a print head having an intrinsic light output closer to the mean. Thus, by varying the system reference voltage, the light output of all of the LEDs in the array can be raised or lowered, as desired, in synchronism.

In addition to variations that may occur due to processing variables of the LED dice, there may be variations in the properties of the integrated circuit chips supplying power to the LEDs. The LED print heads are analog devices and such variations may be more significant than in digital circuits.

To partially compensate for such possible variations, each integrated circuit chip is provided with a reference resistor, $R_1, R_2 \ldots R_n$, the value of which may be selected for assuring that all of the integrated circuit and LED sets on a given print head produce substantially the same light output. As will be described, the present invention is implemented in a circuit which also permits control of the average LED light output on a selected chip as well as control of current variations from LED to LED on a selected chip, both responsive to programming data signals. Typical resistance values for the reference resistors lie in the range from 1,000 to 2,000 ohms.

Figure 2:
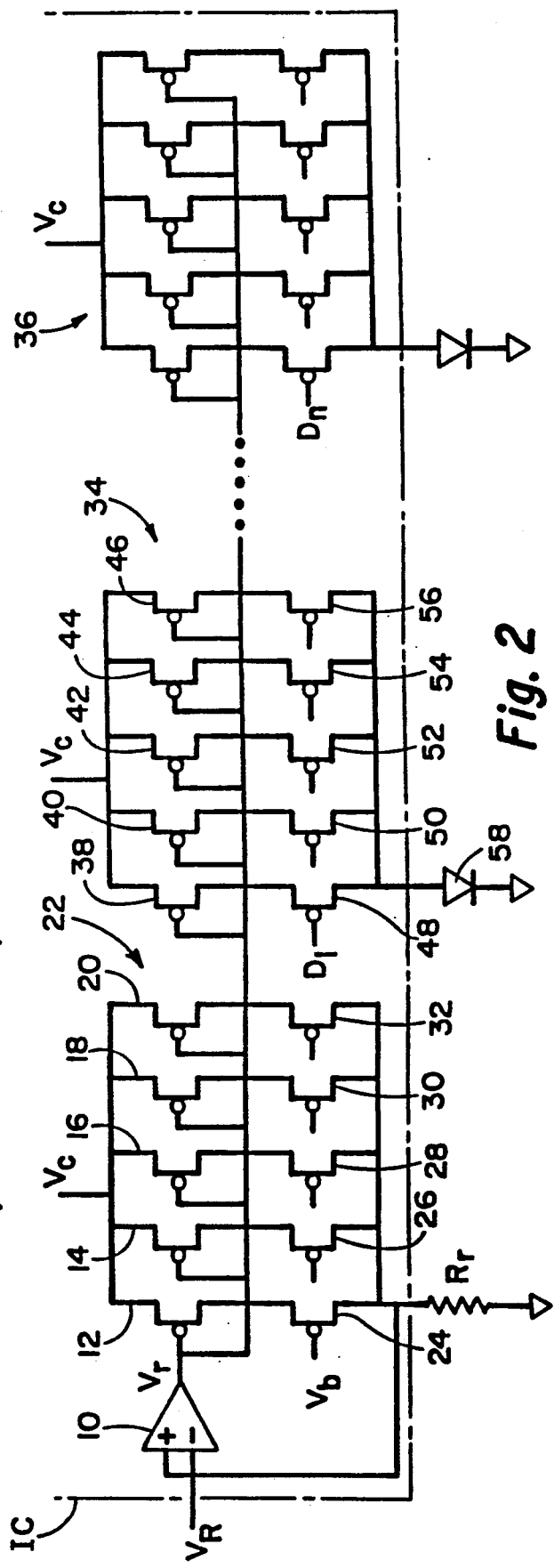
FIG. 2 illustrates a power supply circuit, constructed in accordance with the present invention, for each such integrated circuit chip.

A portion of the circuits on a representative integrated circuit chip are illustrated in FIG. 2. In this drawing, a phantom line indicates the portion of the circuit lying on the chip as distinguished from components such as a reference resistor $R_r$, which, as just mentioned, is preferably located off of the integrated chip. Contact pads for making connections to the chip are omitted, as are many other details of circuits on such a chip which are not material to an understanding of this invention.

The reference voltage, $V_R$, is applied to the inverting input of a conventional operational amplifier 10 of a reference current cell on each chip. Operational amplifier 10 is also referred to herein as a low-impedance voltage source. The operational amplifier is formed by the same processes employed for the balance of the circuitry on the integrated circuit chips.

The operational amplifier output is connected to the gates of a plurality of FETs 12-20 in a reference leg, indicated generally at 22, of the circuit. FETs 12-20 are collectively referred to herein as a reference FET. The output of operational amplifier 10 provides a system reference voltage $V_r$ which is applied to the gates of each of FETs 12-20. The drain of each of FETs 12-20 is connected to the source of a corresponding p-channel FET 24-32. FETs 24-32 are referred to herein as control FETs. The gate of FET 24 is tied to a preselected biasing voltage, $V_b$, which maintains it in a conducting condition. The gates of FETs 26-32 are connected to a source of programming data signals which place each FET in either a conducting or nonconducting condition depending upon whether the programming data signal for the FET is in a low or high state, respectively.

In reference leg 22, amplifier 10 controls the gates of FETs 12-20 and increases or decreases $V_r$ until the voltage at the reference resistor matches the external reference voltage $V_R$ at the inverting input at the amplifier. Thus, current equal to $V_R/R_r$ flows upwardly in reference leg 22 for all operating conditions of the circuit.

FET 12 and FET 24 each have the same width as does each of the other reference-control FET pairs in reference leg 22. However, each of FETs 12-20 and its corresponding control FET 24-32, respectively, has a channel width different from each of the other reference-control FET pairs. FETs 12, 24 have the widest channel width comprising 70% of the sum of channel widths of all FET pairs in leg 22. In the present embodiment, the ratio of the channel widths of FETs 14-20 is 1 to 2 to 4 to 8, respectively. By selecting different combinations of FETs 26-32, the channel width of the reference FET can be varied from 70% to 100% of the total channel width of FETs 12-20 in 2% increments. It can thus be seen that programming data signals applied to the gates of FETs 26-32 may be used to vary $V_r$ because amplifier 10 drives to maintain $V_R$ across $R_r$. Stated another way, the programming data signals applied to the gates of FETs 26-32 change the resistance of the feedback loop of amplifier 10 thereby changing the output voltage, $V_r$. Each of FETs 12-20 have the same length as do FETs 24-32. The length of the channels of FETs 24-32 are relatively short to facilitate their switching function.

Indicated generally at 34, 36 are output legs of the circuit with the circuit comprising a total of n output legs. In output leg 34, FETs 38-46 are collectively referred to herein as an output driver FET. The gate of each of FETs 38-46 is tied to the chip reference voltage $V_r$. The drain of each of FETs 38-46 is tied to the source of a corresponding p-channel FET 48-56, respectively. The drain of each of FETs 48-56 is referred to herein as an IC chip output and is connected to a commercially available LED 58 which is located off the chip.

The gate of FET 48 is tied to a source of data signals $D_1$ which has two conditions: one which permits FET 48 to conduct and the other which cuts it off. The data signal is provided from a computer output for causing printing as described above in a pattern determined by the computer output.

The gates of each of FETs 50-56 is connected to a source of programming data signals which are generated as a function of data signal $D_1$ and another signal which determines whether the FET is conducting or cut off when FET 48 conducts. FETs 38-46 have the same length as FETs 12-20. As in reference leg 22, the FET pairs in each of the output legs have the same channel width. Of the total channel widths of FETs 38-46, FET 38 has 47.5% of the total width. Each of FETs 40-46 have different smaller channel widths. The ratio of the channel widths of FETs 40-46 is 1 to 2 to 4 to 8, respectively. By selecting different combinations of FETs 40-46 to switch in ganged relation with FET 38, responsive to the aforementioned programming data signals, the total channel width of FETs 38-46 can be made to vary from 47.5% of the entire width to 100% thereof (when each of FETs 40-46 conduct in synchrony with FET 38) in 3.5% increments.

It can thus be seen that the current flowing through LED 58, and thus the intensity of light emitting therefrom, is controllable responsive to programming data signals applied to FETs 50-56.

Each of the other output legs, like leg 36, can be similarly controlled by the same, or different, programming data signals applied to control FETs 50-56 in output leg 34.

It can thus be seen that $V_r$ is selectable in accordance with signals applied to the gates of FETs 26-32. These data programming signals are selected to be either a high or a low value dependent upon the average light intensity desired for each of the LEDs driven by the chip. It should be noted that as the total gate width of FETs 12-20 decreases by switching off selected ones of FETs 26-32, $V_r$ decreases thereby driving FETs 38-46 into a greater conducting condition. Such action increases the current and thus the light output of LED 58.

Similarly, the current from LED to LED on the chip may be changed by selecting different combinations of FETs 50-56 which switch in synchrony with FET 48. Variations in light output may thus be made by changing which of FETs 50-56 are so switched in a given output leg of the circuit.

It should be noted that the output impedance of amplifier 10, as is the case with a conventional low-gain operational amplifier, is low relative to the output impedance of a single FET. As data FETs, like FETs 48-56 switch in various output legs of the chip, the op amp drive voltage does not sag as a result of a capacitive coupling between the sources of the data FETs and the gates of the reference FETs, like FETs 38-46. The problem of current overshoot in the current square wave generated by the chip outputs is thus overcome.

Another advantage obtained by the present invention relates to the use of a relatively low power supply voltage $V_C$. In Kalata et al., the gate of the reference FET is connected to its drain. Another FET is connected from that node to the reference resistor. Thus the required power supply voltage is the sum of the voltages across those three components. With respect to the reference FET, the critical voltage is the voltage from its gate to its source. In the present invention, the gate to source voltage of reference FET 12 is determined by the output of the operational amplifier. It is thus not constrained to be less than $V_C$ minus the voltage on resistor 24. Rather it can be equal to all of $V_C$. Considered another way, this means that $V_C$ in the present invention can be less than the $V_C$ in Kalata et al. by the value of the voltage across the reference resistor, namely $V_R$.

Another advantage of the present invention is improved tracking of current from the input reference to the output pad. The system reference voltage $V_R$ can be chosen to match that of a typical LED while being driven with a nominal current. In that case the reference FETs match the output driver FETs with respect to drain voltage, gate voltage, source voltage, and bulk voltage. Since these FETs also are matched in gate length, their electrical conditions are fully matched. Their drain current per gate width thus matches. The current delivered to each LED therefore is a value which is quite stable and easily predicted based upon the total current entering the reference FETs, and the ratio of the total enabled width of the corresponding output driver to the total enabled width of the reference FETs.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A power supply for a light emitting diode print head comprising; a reference FET;

a plurality of output driver FETs, each having an output for connection to a single LED in the print head;

a low impedance voltage source;

means for interconnecting the gates of all the FETs to said low impedance voltage source;
means for passing a constant current through the reference FET;
means for enabling current flow from each output driver FET to tis respective LED in response to a data signal, said enabling means comprising:
a control FET connected in series with each output driver FET; and
means for biasing said control FETs in response to programming data signals thereby controlling the current level through the LED.

2. The power supply of claim 1 wherein said low impedance voltage source comprises an operational amplifier.

3. The power supply of claim 2 wherein said means for passing a constant current comprises a current source regulated by said operational amplifier and a reference resistor for setting the current.

4. The power supply of claim 1 wherein said means for enabling current flow comprises a data FET in series with each output driver FET and means for applying a data signal to the gate of the data FET.

5. A power supply for a light emitting diode print head comprising:
a plurality of reference FETs;
a plurality of output driver FETS, each having an output for connection to an LED;
a low impedance voltage source;
means for interconnecting the gates of all the FETs to said low impedance voltage source;
means for passing a constant current through each reference FET;
means for enabling current flow from each output driver FET to its respective LED in response to a data signal;
means for varying the voltage produced by said source, said varying means comprising:
a control FET connected in series with each reference FET; and
means for biasing said control FETs in response to programming data signals thereby controlling the total current level through the reference FETs.

6. The power supply of claim 5 wherein said means for enabling current flow from each output driver FET to its respective LED in response to a data signal further comprises:
a plurality of output driver FETs, each having an output for connection to a single LED in the print head;
a control FET connected in series with each output driver FET; and
means for biasing said control FETs in response to programming data signals thereby controlling the current level through the LED.

7. A method for providing a substantially square wave current to a plurality of LEDs comprising the steps of:
generating a voltage having a relatively low drive impedance;
passing a constant current through a reference FET;
providing the voltage to the gate of the reference FET and to a plurality of output drive FETs, each of which has an output connected to a single LED in the print head;
generating a data signal; and
enabling current flow from selected output driver FETs responsive to the data signal, said enabling step comprising the step of enabling or preventing current flow through selected ones of a plurality of control FETs, each of which is connected in series with a different output driver FET.

8. The method of claim 7 wherein said method further comprises the step of using the voltage to regulate a current source.

9. The method of claim 8 wherein the step of passing a constant current through a reference FET comprises the step of passing current generated by the current source through the reference FET.

10. A method of providing a substantially square wave current to a plurality of LEDs comprising the steps of:
generating a voltage having a relatively low drive impedance;
passing a constant current through a plurality of reference FETs;
providing the voltage to the gates of the reference FETs and to a plurality of output driver FETs, each of which has an output connected to an LED;
generating a data signal;
enabling current flow from selected output driver FETs responsive to the data signal; and
varying the low-drive-impedance voltage, said varying step comprising the step of enabling or preventing current flow through selected ones of a plurality of control FETs, each of which is in series with a difference reference FET.

11. The method of claim 10 wherein the step of enabling current flow from selected output driver FETs responsive to the data signal comprises the step of enabling or preventing current flow through selected ones of a plurality of control FETs, each of which is in series with a different output driver FET.

12. A power supply for a light emitting diode print head comprising:
a plurality of integrated circuit chips, each chip having a plurality of outputs for supplying current to each of a plurality of respective LEDs;
means for applying a system reference voltage to each of the integrated circuit chips;
means for generating a chip reference voltage for each of the plurality of chips in response to the system reference voltage, said generating means comprising a plurality of control FETs in a feedback loop thereof;
means for applying a current to each LED output which is a function of the respective chip reference voltage and the presence or absence of a data signal for such LED output; and
means for varying the chip reference voltage of each chip responsive to programming data signals applied thereto.

13. The power supply of claim 12 wherein said means for generating a chip reference voltage comprises an amplifier having a plurality of control FETs in a feedback loop thereof.

14. The power supply of claim 12 wherein said means for varying the chip reference voltage comprises means for biasing said control FETs to different conducting conditions thereby varying the amplifier output voltage.

15. The power supply of claim 14 wherein said means for biasing said control FE different conducting conditions thereby varying the amplifier output voltage comprises means for enabling or preventing current flow through selected ones of said control FETs responsive to data signals.

16. The power supply of claim 12 wherein said means for applying a current to each LED output comprises an output driver FET and wherein said supply further includes a plurality of control FETs connected in parallel with one another and in series with each output driver FET and means for biasing said control FETs to different conducting conditions.

17. The power supply of claim 16 wherein said means for biasing said control FETs to different conducting conditions comprises means for enabling or preventing current flow through selected ones of said control FETs responsive to programming data signals.

* * * * *

UNITED STATES PATENT AND TRADEMARK OFFICE
CERTIFICATE OF CORRECTION

PATENT NO. : 5,099,192
DATED : March 24, 1992
INVENTOR(S) : Billy E. Thayer et al It is certified that error appears in the above-indentified patent and that said Letters Patent is hereby corrected as shown below:

Col. 7, Claim 7, line 63 of the Patent, delete "drive" and insert therefor --driver--.

Signed and Sealed this

Fifteenth Day of March, 1994

*Attest:*

BRUCE LEHMAN

*Attesting Officer*  *Commissioner of Patents and Trademarks*